United States Patent [19]

Case et al.

[11] Patent Number: 5,002,477
[45] Date of Patent: Mar. 26, 1991

[54] QUICK-CHANGE TRIM PRESS

[75] Inventors: Charles B. Case, Eau Claire; Michael G. Martell, Chippewa Falls, both of Wis.

[73] Assignee: Amoco Corporation, Chicago, Ill.

[21] Appl. No.: 281,843

[22] Filed: Dec. 8, 1988

Related U.S. Application Data

[63] Continuation of Ser. No. 11,045, Feb. 5, 1987, abandoned.

[51] Int. Cl.$^5$ .............................................. B29C 43/00
[52] U.S. Cl. .................................. 425/185; 425/193; 425/411; 425/451
[58] Field of Search ................... 72/481, 482; 100/214, 100/918; 164/341; 269/25, 271, 275; 425/182, 184, 185, 186, 190, 192 R, 193, 195, 411, 451, 451.7, 451.9, 452, 575, 595

[56] References Cited

U.S. PATENT DOCUMENTS

| | | | |
|---|---|---|---|
| 3,422,661 | 1/1969 | Blackhurst | 100/918 |
| 4,472,127 | 9/1984 | Cyriax et al. | 425/186 |
| 4,608,005 | 8/1986 | Hayashi et al. | 425/451.7 |
| 4,718,339 | 1/1988 | Wymann | 100/918 |
| 4,768,946 | 9/1988 | Maruyama et al. | 425/451.7 |

FOREIGN PATENT DOCUMENTS 56-102023  8/1981  Japan .
516678  1/1940  United Kingdom ................. 425/193

Primary Examiner—Jay H. Woo
Assistant Examiner—C. Scott Bushey
Attorney, Agent, or Firm—William E. Murray; William H. Magidson; Ralph C. Medhurst

[57] ABSTRACT

In a press, a platen has opposed fluid, preferably hydraulically, actuated clamp blocks thereon. Each block functions to register with an open-ended slot in a tool mount plate and upon translation of the block to enter an offset slot section in a clamped or locked relationship. The offset slot sections are opposed one another, wedge-shaped, and complementary to block configuration. The tool mount plate can be quickly and conveniently attached and aligned or removed from the platen as needed.

7 Claims, 2 Drawing Sheets

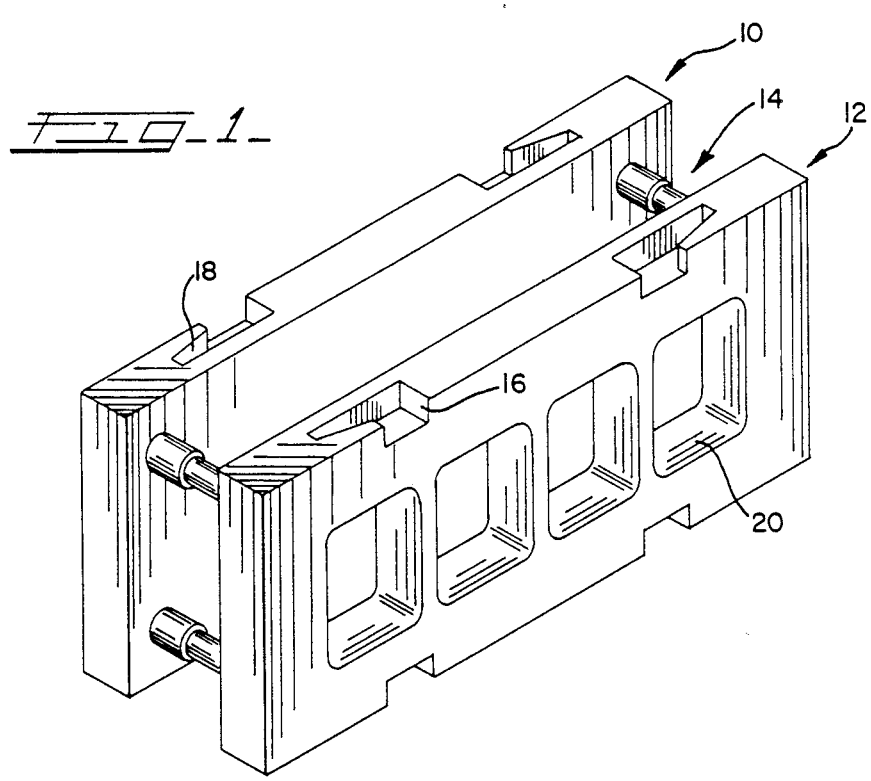
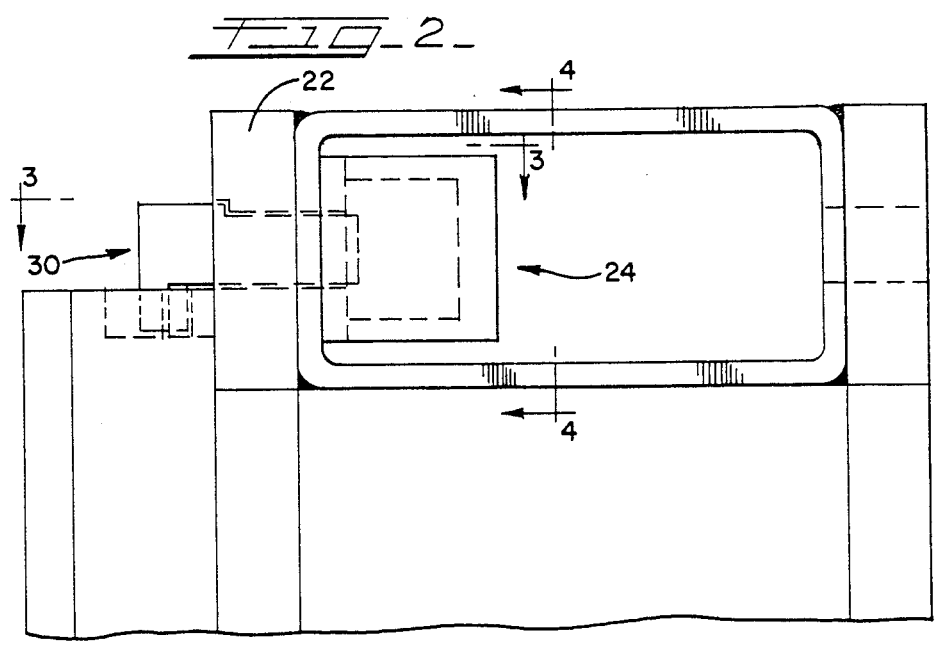

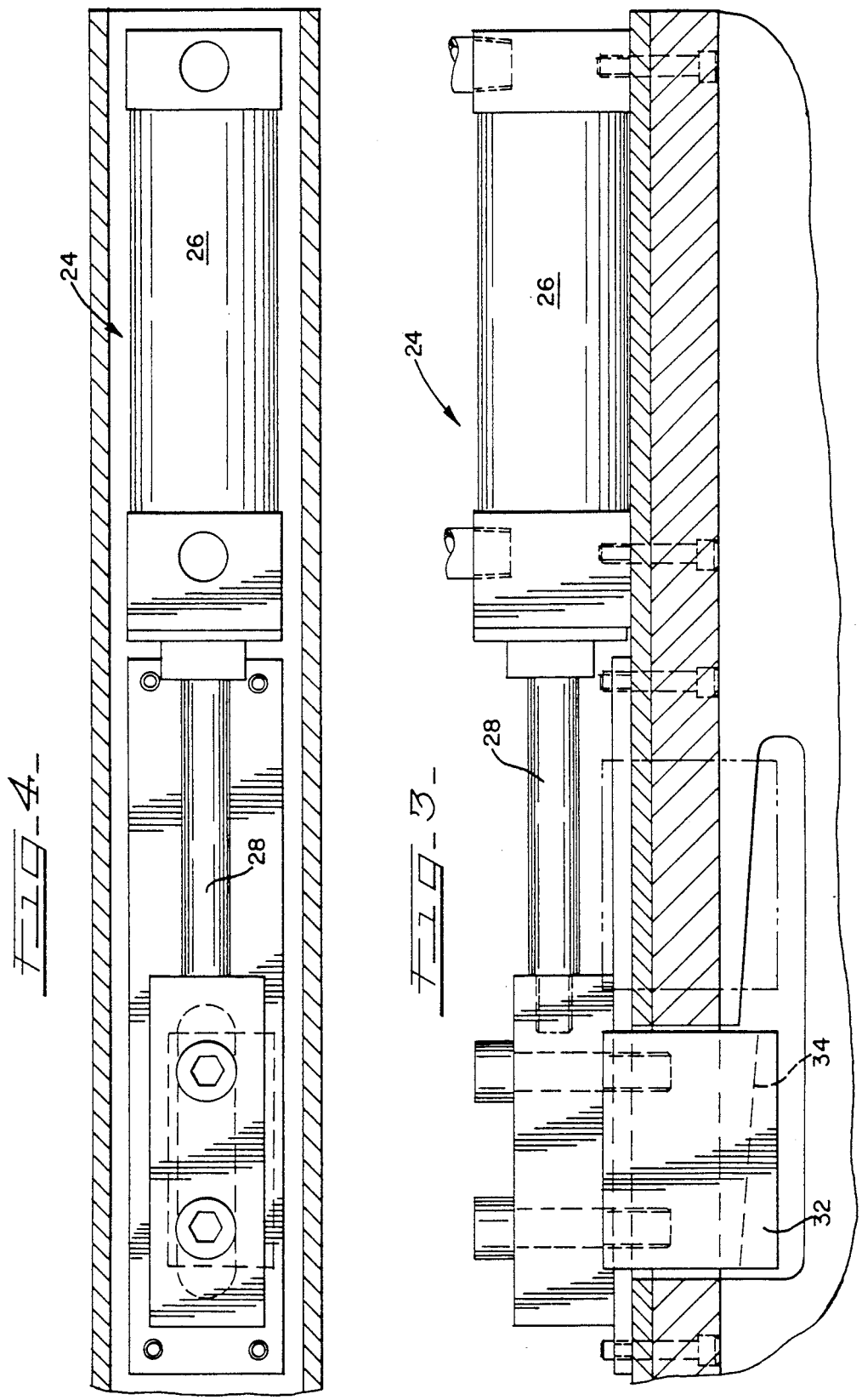

QUICK-CHANGE TRIM PRESS

This is a continuation of application Ser. No. 011,045, filed Feb. 5, 1987, now abandoned.

TECHNICAL FIELD

The present invention relates to an improved and novel fixture quick-change means whereby a fixture can be quickly changed yet securely fastened to a work surface during operations involving the fixture.

BACKGROUND OF THE INVENTION

To be cost efficient in operation of a high production system, such as stamping, molding, machining, and the like, it is requisite that fixture exchange time be minimal so as to hold to a minimum, or eliminate, downtime. This is especially true in a highly automated molding system where the physical and chemical state of the materials worked on presents additional down-time problems.

Operations involving the movement of fixtures of substantial size and/or weight are typically cumbersome and time-consuming, especially when the fixtures must be secured to a work surface after placement or repositioning thereon. Exact positioning of the fixture is often critical in achieving the desired results from the fixture and can be difficult to achieve with sizable, heavy fixtures. Further, the removal of such sizable fixtures involves laborious, time-consuming efforts to unsecure and remove the fixture from the work surface. The effort required to move such fixtures results in reduction of the rate of operations, increased labor expenses, and decreased flexibility in scheduling operations requiring different fixtures.

In the field of molding, e.g., injection molding and thermoforming, various sizes of molds are used to produce different products. The commercially used molds are typically quite heavy and cumbersome to move. The mount plates used to trim the products resulting from the thermoforming differ for each product and likewise are often of substantial size and/or weight. Most commercial operations routinely involve the production of a variety of molded products to meet customer requests. The amount of the product varies and the molds are changed according to the amount required of a particular product. The diversification of products as well as varying customer requests often requires frequent change of the molds or dies used in molding and associated operations. Further, the molds or dies must often be inspected and repaired or replaced. The removal and insertion of the molds or dies has typically involved the laborious and time-consuming manipulation of various service fittings and the realignment of the mold or die to resume operations. In any high production operation, the down-time accompanying the change of molds or dies and the associated labor costs must be minimized to maintain the desired productivity. Therefore, a system which contains means for the quick change of a fixture such as a mold or a die in which the fixture can be quickly and securely fastened or released from a work surface is desirable.

Attempts to effect such quick change need by modification of clamping means has been attempted; see for instance the U.S. Pat. Nos.:

| | | |
|---|---|---|
| 2,940,384 | June 16, 1980 | Manschuer et al. |
| 4,058,885 | November 22, 1977 | Bergman |
| 4,354,796 | October 19, 1982 | Bergman |
| 4,472,127 | September 18, 1984 | Cyriax et al. |
| 4,555,228 | November 26, 1985 | Nishiike et al. |

However, none of the corresponding structure described therein has been fully satisfactory in meeting said need, particularly in a press such as a trim press.

It is an object of the present invention to provide a positive and simplified registration means for the fixture, that the latter means be part of the clamp structure, and that the fixture comprise the mount plates for punch and die tools of a trim press.

It is a further object of the invention that the described improved and novel means be inexpensive and uncomplicated with respect to manufacture, assembly and use.

SUMMARY OF THE INVENTION

The present invention is directed to novel and improved quick-release and-lock clamp means to facilitate rapid exchange of a fixture at a work station, especially at a trim press station in a continuous molding system. The present invention relates to a combination in a situation of a production system having means to facilitate rapid registration of, and rapid insertion, withdrawal and exchange of a fixture comprising:

fixture means having at least a pair of clamp slots formed therein;
  each slot (1) is open-ended at an outer face of the fixture and is adapted thereat for clamp block registration and (2) has an offset section that is spaced from said face and adapted for clamp block locking;
  the offset sections of each pair of slots being in opposed relationship;
at least one fixture related platen supporting at least a pair of clamp blocks;
each clamp block being configured in part for registration with and entry into the open end of each clamp slot;
said clamp block configured part also conforming to the angularity of its associated offset slot section; and
power means to translate said clamp blocks with respect to said slots;
whereby after said entry and registration, the power means can be actuated and the blocks moved to clamping position in the respective offset slot sections, or conversely, in the case of a clamped fixture, the power means can be actuated to move the blocks out of clamping position.

For a more fully developed presentation of the invention, and a preferred embodiment thereof, reference is made to the following descriptive matter and attached drawings.

BRIEF DESCRIPTION OF THE DRAWINGS

FIG. 1 is a perspective view of mount plates for punch and die tools.

FIG. 2 is a partial elevational side view of the trim press and shows a side edge view of a mount plate and an end view of a hydraulic cylinder and clamp therewith.

FIG. 3 is a view taken on cut line 3—3 of FIG. 2 and shows a clamp-block in open (full line) and closed (broken line) positions.

FIG. 4 is a view taken on cut lines 4—4 of FIG. 2 and shows the back side of the clamping arrangement.

DETAILED DESCRIPTION OF THE INVENTION

The embodiment shown and described is only illustrative of the present invention and is not to be construed as being delimitive thereof; since once being apprised of the invention, changes in structure would be obvious and readily apparent to one skilled in the art. Referring to the drawings which illustrate a preferred embodiment of the invention and wherein like numerals indicate like elements of structure, there is shown in FIG. 1 assembled tool mount plates; herein a punch mount plate 10 and die mount plate 12 that operatively associate through bushing and rod means 14.

Outer, opposed edge defining contiguous surfaces of said plates have formed therein at least one pair of opposed clamp slots. Each clamp slot is defined by a first section that appears as a rectangular slot 16 when the plate is viewed in the elevational and a second section 18 that, when the plate is viewed in plan at the upper edge, appears as wedge shaped; the wedge being spaced from the face of the plate and the slot narrowing towards the near side edge of the plate.

The plate arrangement is mounted spatially as shown in FIG. 1, molded or the like workpieces fed in vertical direction therethrough and the products ejected in horizontal direction through opening 20 of the die plate.

The mount plates are mounted on respectives ones of platens 22. Each platen has pairs of opposed, identical clamp means 24 corresponding to the pairs of mount plate clamp slots. The clamp means comprise a hydraulic cylinder 26 having a piston rod 28 that carries a clamp block 30. The block is formed with a wedge-shaped extension 32 that in end view of which is shown as a depending portion in FIG. 2 and the angularity of which is shown by broken line 34 in FIG. 3.

The block wedge angularly (line 34) conforms to that of the slot wedge section. The cross-section of the block wedge, in the longitudinal direction, can conform to that of the slot's open end section.

For insertion and fixing in a trim press, the mount plate assembly first registers by entry of the block wedges through the open end slot sections until, at the end of travel, both block and wedge portions are aligned; see FIG. 3, the block in solid lines. There can also be locator pins on the surface of one platen which register with openings on the mount plate and do the final referencing of the plate to the platen prior to locking by the block wedges. Thereafter, fluid power, either pneumatic or hydraulic, preferably hydraulic, is actuated whereby to draw the block wedges into locking position as shown by the corresponding broken lines in FIG. 3. Of course, the mount block assembly can be registered and locked with respect to one platen at a time or can be registered with respect to both platens and simultaneously locked in and the entire operation can be automated.

While the invention is illustrated in a trim press and has a special utility with a trim press in an overall molding system, the quick-change means has a generic utility.

In this instance, the trim press is but one station of a highly automated system to manufacture molded products and in connection therewith, attention is given to applicant's U.S. Pat. No. 4,773,839 issued Sept. 27, 1988, entitled "QUICK-CHANGE THERMOFORMER", filed on instant date herewith and the disclosure of which is incorporated herein by reference.

The embodiment shown and described is only illustrative of the present invention and is not to be construed as being delimitive thereof; since once being apprised of the invention, changes in structure would be obvious and readily apparent to one skilled in the art. Hence, the present invention includes all modifications encompassed within the spirit and scope of the following claims.

I claim:

1. An apparatus having means to facilitate rapid registration of, and rapid insertion, withdrawal and exchange of, a fixture comprising:

fixture means having at least a pair of clamp slots formed therein;

each slot (1) is open-ended at an outer face of the fixture for clamp block registration and (2) has an offset section that is spaced from said face for clamp block locking;

the offset sections of each pair of slots being in opposed relationship;

at least one fixture related platen supporting at least a pair of clamp blocks;

each clamp block being configured in part for registration with and entry into the open end of each clamp slot;

said clamp block conforming to the shape of its associated offset slot section and power means to translate said clamp blocks with respect to said slots;

whereby after said entry and registration, the power means move the blocks to clamping position in the respective offset slot sections.

2. The apparatus of claim 1 wherein the offset slot sections and the configured clamp block complementary thereto, are each wedge shaped.

3. The apparatus of claim 1 wherein the station is a trim press and the fixture comprises an assembly of a punch mount plate and a die mount plate and said registration and clamping means is provided for each plate.

4. The apparatus of claim 2 wherein the station is a trim press and the fixture comprises an assembly of a punch mount plate and a die mount plate, said registration and clamping means is provided for each plate and at least one platen is movable.

5. The apparatus of claim 1 wherein each slot is formed in contiguous edge defining surfaces, thereby presenting an open channel in each said surface.

6. The apparatus of claim 2 wherein each slot is formed in contiguous edge defining surfaces, thereby presenting an open channel in each said surface.

7. The apparatus of claim 3 wherein each slot is formed in contiguous edge defining surfaces, thereby presenting an open channel in each said surface.

* * * * *